Jan. 19, 1954

R. E. GRAHAM ET AL 2,666,356

SERVO SYSTEM FOR NONINTERMITTENT FILM PROJECTORS

Filed June 13, 1950

TO MOVING COIL
MOTORS ON
CORRECTING
MIRRORS

DIFFERENCE
AMPLIFIER

INVENTORS R. E. GRAHAM
C. F. MATTKE
BY
Hugh S. Wertz
ATTORNEY

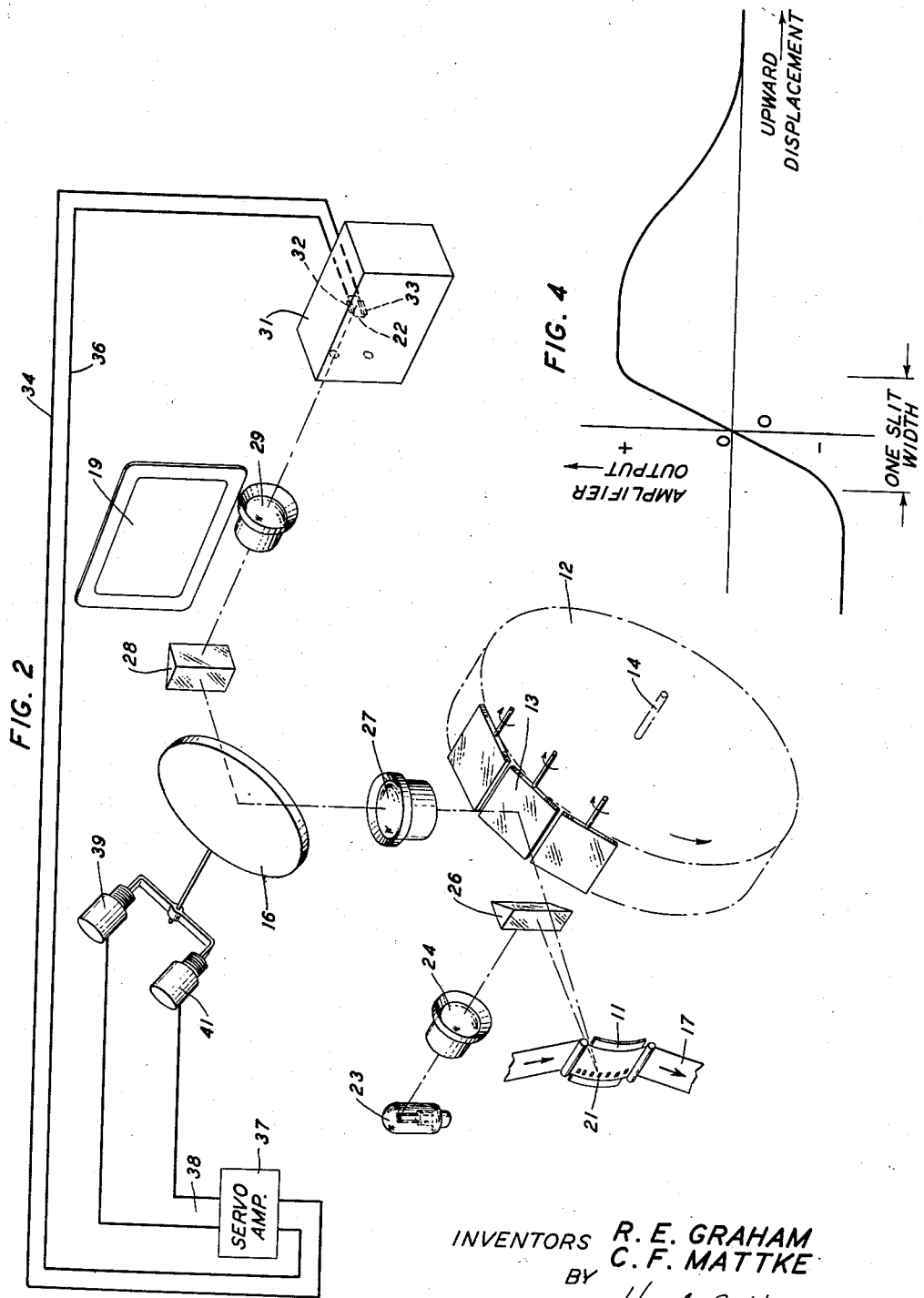

Jan. 19, 1954   R. E. GRAHAM ET AL   2,666,356
SERVO SYSTEM FOR NONINTERMITTENT FILM PROJECTORS
Filed June 13, 1950   4 Sheets-Sheet 3

INVENTORS R. E. GRAHAM
C. F. MATTKE
BY
Hugh S. Wertz
ATTORNEY

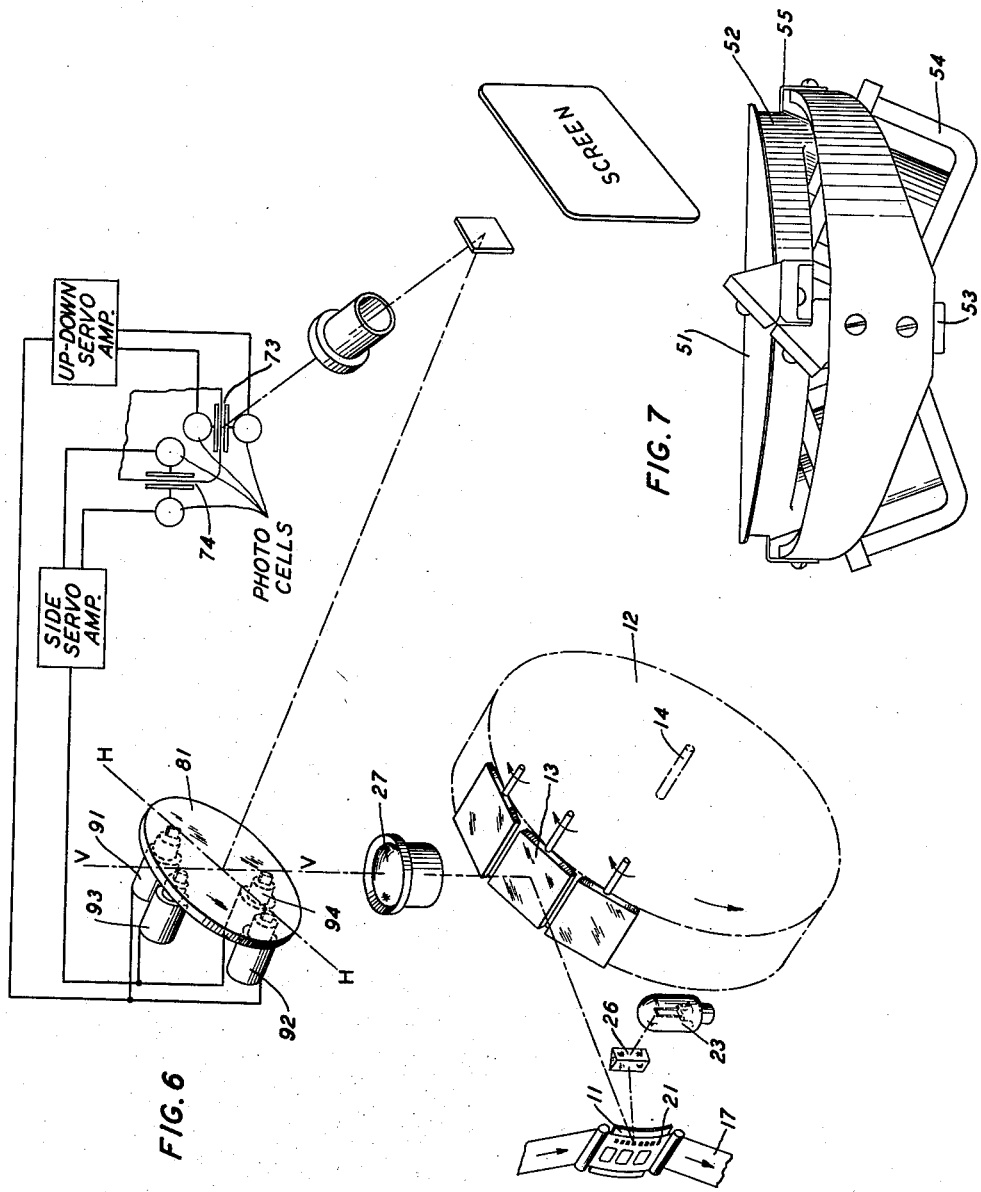

Patented Jan. 19, 1954

2,666,356

UNITED STATES PATENT OFFICE 2,666,356

SERVO SYSTEM FOR NONINTERMITTENT FILM PROJECTORS

Robert E. Graham, Morristown, and Charles F. Mattke, Fanwood, N. J., assignors to Bell Telephone Laboratories, Incorporated, New York, N. Y., a corporation of New York Application June 13, 1950, Serial No. 167,872

5 Claims. (Cl. 88—16.8)

This invention relates to a continuous projector for motion pictures.

An object of the invention is to provide an improved optical projector whereby stationary and continuously moving optical patterns may be produced one from the other.

In the pending application of Charles F. Mattke, Serial No. 124,403, filed October 29, 1949, there is disclosed a special film projector by means of which the frames of a continuously moving motion picture film are projected as stationary images on a viewing screen, and the illusion of scene or subject motion is produced as images of successive frames are merged on the viewing screen. This projector compensates for the motion of the film by employing a rotating crown of mirrors in the optical path. When viewed through the crown of mirrors, the film motion appears to be stopped so that successive frames blend into and out of view without flicker.

This projector, in an important example of practice, may also be used as a scanner of continuously moving motion picture film for television purposes. Ordinarily, the television scansion of motion picture film presents considerable difficulty in that the movie standard is 24 frames per second as compared with the television standard of 30 frames or 60 fields per second. The special projector disclosed in the Mattke application, however, by virtue of its non-intermittent operation, avoids the consequences of this dissimilarity. In one illustrative embodiment of this example of practice, the viewing screen is replaced by the luminescent screen of a cathode-ray tube, the cathode beam of which is caused to scan the screen in any desired manner to form a scanning pattern or raster. By means of the projector disclosed in the copending application, this pattern is projected on the frames of a continuously moving motion picture film, thereby scanning the frames of the film, element by element. The transmitted light is directed to a photoelectric device wherein corresponding television image currents are produced.

The above-described projector, however, necessitates very close mechanical tolerances in its operation, and an extremely high degree of precision is therefore required in its construction. Of especial consequence is the disturbing effect of either horizontal or vertical displacement of the film from its proper instantaneous position.

It is, therefore, an object of the present invention to effect a substantial reduction in the precision construction required and to increase the mechanical tolerances of the continuous film projector, while retaining all its advantages.

It is also an object of the present invention to compensate automatically for the adverse effects of film displacement in the continuous projector.

This is done, in accordance with the present invention, by incorporating into the Mattke projector a position-correcting servo. Deviations from a reference position of reflected film sprocket hole images are made to produce error signals which cause a correcting mirror in the optical path to restore the film image to its proper position. These error signals, in one exemplary embodiment of the invention, are (when compensating for vertical displacement, for example) generated by a pair of photoelectric cells which compare the amounts of light reflected from the upper and lower borders of the sprocket holes or from neighboring areas on one side (upper or lower edge) of the sprocket holes.

The invention will be more fully understood from the following detailed description of certain illustrative embodiments thereof taken in connection with the appended drawings, in which:

Fig. 2 shows the details of an illustrative embodiment of the correcting servo and its operation in the practice of the invention;

Fig. 4 is a plot of error amplifier output versus upward displacement of the sprocket hole image;

Fig. 5 shows an illustrative embodiment of the invention in which both horizontal and vertical correction is effected;

Fig. 5A shows an arrangement for using the guided edge of the film as a reference in the practice of the embodiment of the invention shown in Fig. 5;

Fig. 6 illustrates another embodiment of the invention in which both horizontal and vertical correction is effected; and Fig. 7 is a detailed drawing of a preferred embodiment of the error-correcting mirror and its associated elements.

Figure 1:
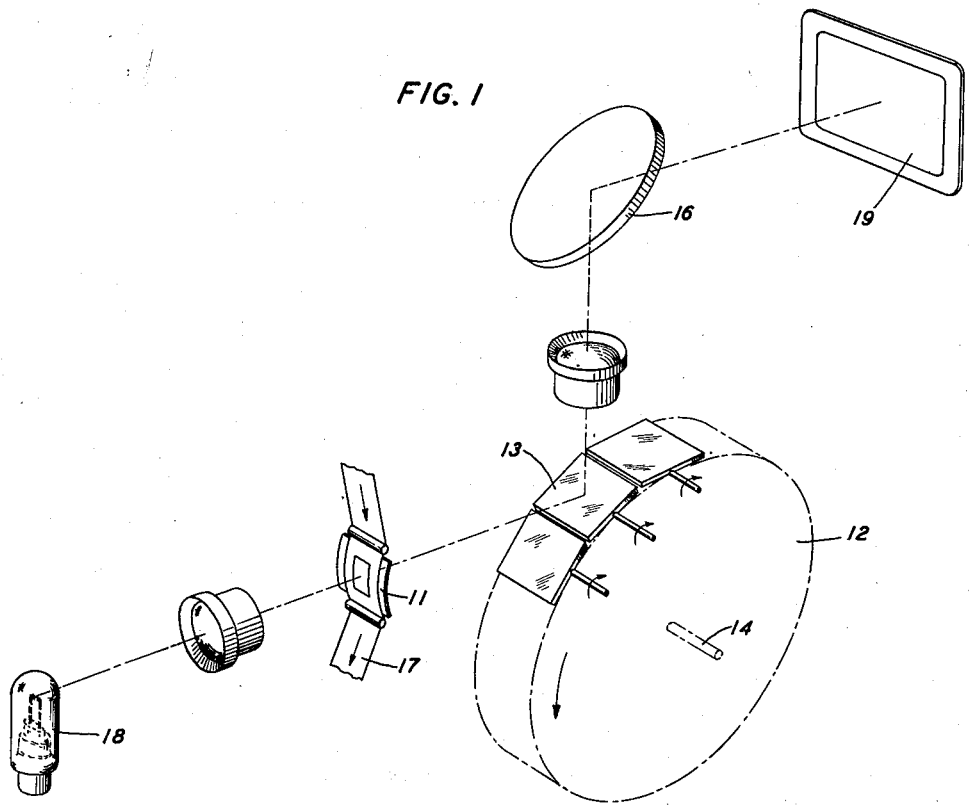
Fig. 1 shows in schematic form the general arrangement of the non-intermittent projector.

It will be instructive at this point to identify the several basic components of an illustrative embodiment of the continuous film projector, as shown in Fig. 1, and the manner in which they cooperate with each other to accomplish the desired result. The principal components are a curved film gate 11 with a radius of curvature R; a rotating mirror drum 12 which contains a crown of mirrors 13, whose axes are mounted parallel with the drum axle 14; and an error-correcting mirror 16. The film 17 is moved down at a constant rate through the gate 11, where, in one exemplary arrangement of the projector, approximately two and one-half frames are illuminated by the light source 18. To facilitate explanation of the operation of the device, let us assume temporarily that crown mirror 13 and correcting mirror 16 remain stationary. Then the screen picture 19 will move upward at the frame rate of the film. This picture motion is canceled when the rotation of the mirror drum 12 imparts the proper angular rotation to mirror 13, and to each successive crown mirror, frame by frame. This desired angular rotation is obtained by means of a gear train between the mirror drum and film sprocket together with a cam and follower actuation of the individual crown mirrors about their respective axes. For a complete description of this arrangement, reference can be made to the pending application of C. F. Mattke, which has already been mentioned.

Because of perturbations of the film motion at the gate and mechanical inaccuracies of the crown mirror drive, it is impossible to obtain precisely the desired angular rotation, and it is thus the purpose of the servo-correcting mirror 16 to suppress the residual errors in picture position due to these causes.

The technique by which this correction is accomplished is shown in Fig. 2. Film sprocket holes 21, which are used to locate the film during the photographic processes of exposure and printing, can be made to serve as an accurate index of film position in deriving an error signal to actuate the correcting mirror. In accordance with the invention, images of the sprocket holes may be produced for this purpose either by transmitting light through the sprocket hole and surrounding region of the film or by reflecting light from this region. The transmission method is sensitive to variations in film density around the border of the sprocket hole due to exposure differences or scratches. On the other hand, specular reflection from the hole border is relatively insensitive to these variations, and, in the preferred embodiment of the invention shown in Fig. 2, it is this technique which is employed, although it is to be understood that the transmission method is equally within the purview of the invention.

In accordance with the exemplary embodiment of the invention shown in Fig. 2, the reflected image 22 is obtained by the use of an auxiliary light source 23 on the crown side of the gate 11. The light is directed to the sprocket hole area of the film through a prism 26 and a lens 24. The smooth surface of the film forms a cylindrical mirror which reflects the light, except where it impinges on the holes themselves, back to the crown mirror 13, where it is deflected up through the lens 27. It is then deflected by the correcting mirror 16 to a second prism 28 and lens 29 at one side of the field, where the image 22 is directed upon the photocell pick-up 31. This pick-up consists of two photocells and is so located and masked (having apertures 32 and 33) that the reflected light which outlines the sprocket hole image 22 casts equivalent amounts of light upon each cell when the picture is in its proper position, and in that case the two photocell signals 34 and 36 cancel one another at the servo-amplifier 37.

Any vertical movement of the sprocket hole image will, however, cast non-equivalent amounts of light upon the two cells, and the output of the two cells will not then cancel each other. This unbalance in the outputs of the two cells forms an error signal 38 which is amplified and sent to the two individual moving-coil driver units 39 and 41 which drive the correcting mirror 16, and thus the mirror is driven to return the image to its proper position.

It is also in accordance with the practice of the invention, in those embodiments in which motion picture images are being projected onto a screen, to locate the error-detecting means at that screen, rather than in the projector itself. And it is similarly within the scope of the invention, in all its embodiments, to have the error pick-ups adjusted not so that they necessarily pick up equal amounts of light when the picture is in its proper position, but so that their outputs are equal. That is, the balance position can be so chosen that one photocell pick-up receives considerably more light than the other, but the gains of the photocells are so adjusted as to provide identical outputs.

Figure 3:
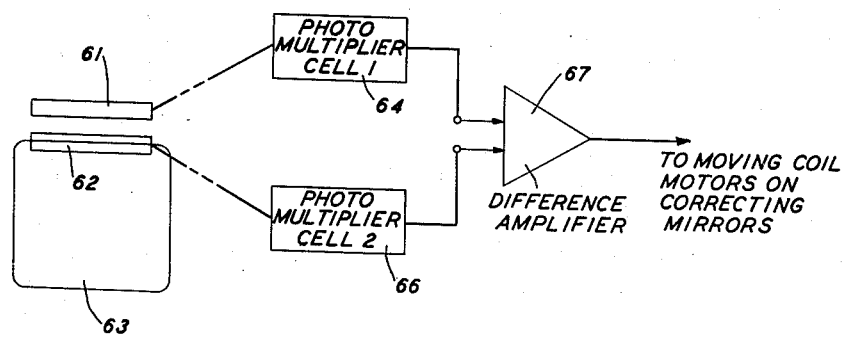
Fig. 3 illustrates a preferred arrangement of the error-detecting circuit which is in accordance with the invention.

In Fig. 3, there is shown one such illustrative arrangement of the photocell pick-ups. In this arrangement, the position of just the top edge of the sprocket hole image is monitored, instead of both the top and the bottom edges, as in the embodiment discussed above. In Fig. 3, as drawn, the slits 61 and 62 and the sprocket hole image 63 are shown in their relative positions for the correct picture position. Under this condition, slit 62 is bisected by the top edge of the sprocket hole image 63, and slit 61 is entirely in the uniformly illuminated region. Obviously, since light reflected from the sprocket hole region is being used, the image of the hole is dark, whereas the surrounding regions are bright. Thus, slit 62 is receiving half the total light received by slit 61. The gains of the two photomultipliers 64 and 66 are nevertheless so adjusted that equal responses are obtained from the two cells under this condition. The differential amplifier 67 subtracts the two equal input signals and thus produces zero output to the motors which drive the corrector mirror. But when the sprocket hole image is displaced downward, slit 62 receives more light than in the balanced condition, while the amount of light on slit 61 is unchanged. This causes the proper polarity of output from the differential amplifier 67 to correct for the image displacement. When the sprocket hole image is displaced upward, slit 62 receives less light than in the balanced condition, and if the displacement continues far enough, it will be completely in the dark. Since the light on slit 61 remains unchanged (at least until the top edge of the sprocket hole image 63 reaches it) the output of the differential amplifier has the opposite polarity, and the image displacement is similarly corrected.

With an arrangement of this sort, the output of difference amplifier 67 varies with the upward displacement of the sprocket hole image from its reference position approximately as shown in Fig. 4. Displacements in that figure are plotted in terms of slit widths, and for purposes of illustration, it is of interest to note that the widths of the slits which are at present extensively used are approximately 0.006 inch, the slits being separated by about 0.005 inch, while the sprocket hole image is about 0.15 inch high.

The reason for monitoring just the one edge is to avoid spurious error indications which can be caused by non-uniform variations in the brightness of the sprocket hole image throughout the cam cycle of the projector. Slight instantaneous brightness gradients occur in the image at certain relative positions of the crown mirrors and the film, and if two monitoring slits, at the top and the bottom of the sprocket hole image, respectively, are employed, this gradient creates a false unbalance between them. In the practice of the present arrangement, however, the two slits 61 and 62 to be compared are very close together, so that mild brightness gradients do not produce appreciable unbalance.

For purposes of simplicity of exposition, the embodiments of the invention which have thus far been described are such as to correct for vertical errors of film position. It is, however, in accordance with the invention to compensate for both vertical and horizontal errors of position, and Figs. 5 and 6 illustrate two exemplary arrangements for accomplishing this.

The embodiment drawn in Fig. 5 is substantially the same as that shown in Fig. 2, with the addition of an almost duplicate arrangement for the elimination of horizontal deviation. In this double mirror system, one mirror 71 serves to eliminate vertical jitter while the other mirror 72 compensates for horizontal errors. In the figure, the respective mirror axes are shown as VV for mirror 71 and HH for mirror 72. Mirror 71 is driven by moving coil driver units 91 and 92, and mirror 72 is driven by moving coil units 93 and 94. The mirror assembly used for each component can, in accordance with the invention, be similar to that shown in Fig. 7 and described below in connection with that figure. The error detecting unit consists of two double slit assemblies 73 and 74, with the necessary photocell back of each slit. The location of the slits is such that both the vertical and horizontal edges of the sprocket hole image are effective, slit assembly 73 treating the vertical and slit assembly 74 the horizontal. As an alternative arrangement, the horizontal guided edge of the film can be used instead of the edge of the sprocket hole, as illustrated in Fig. 5A. In Fig. 6 there is shown an exemplary embodiment of the invention in which both horizontal and vertical correction is effected by a single mirror 81 pivoted on a single point and driven by two sets of driver units, one set for vertical correction about axes VV and the other set for horizontal correction about axes HH.

In order to illustrate the operation of the system, it will be helpful to describe the mechanical design of the compensating mirror assembly of one particular version which has actually been constructed and which performs extremely well, although it is obvious that many other particular designs, all within the scope of the invention, are thoroughly feasible and perhaps, in some situations, considerably to be preferred.

In designing the specific model now under discussion, it was considered important that the error-correcting mirror be provided with high stiffness and a low moment of inertia. A small inertia enables the use of smaller driving units and demands less power from the servo-amplifier 37, while high stiffness prevents the mirror from breaking up into higher modes of vibration. In Fig. 7 there is shown one highly suitable type of mirror which can be used in the specific embodiment of the invention of the present discussion. This mirror 51 can be formed by cutting an ellipse from a planoconvex lens blank and polishing the flat surface. This shape is well suited for handling the bundle of the light which strikes the mirror and it places most of the mirror mass near the axis of rotation, which is the minor axis of the ellipse. To illustrate the order of magnitude of the dimensions of an exemplary mirror of this type, it may be stated that one satisfactory version of the mirror which can be used in the representative embodiment of the invention under discussion has dimensions of three by four and one-half inches, with a maximum thickness of three-eighths inch at the center. In that particular embodiment, a cast aluminum cradle 52 is firmly cemented to the back of the mirror for mounting purposes.

This cradle contains bosses upon which the moving coils of the driver units are cemented. The cradled mirror is spring mounted on a stationary frame 53, which supports the magnets 54, so that the voice coils are concentric with the magnet plugs. The mirror, as stated above, is driven by two equal and opposite forces supplied by the two moving coil driver units, which, in the particular embodiment being discussed, may comprise two General Electric S-545-D moving coil driver units or their equivalents. The cradled mirror is supported on the stationary frame 53 by means of two flat springs, one on each side of the assembly. One end of each spring is clamped to the mirror cradle 52 and the other end to the stationary frame, so that the support effectively consists of two spring steel cantilever beams. This type of suspension is by no means the only type which is feasible in the practice of the invention, but it has been described as a convenient example because it is stable and fairly easy to construct. It is desirable in this sort of arrangement for the mounting constraint to have low stiffness about the axis of rotation and a high stiffness to any other motion, and this can be accomplished by using thin, narrow springs having a very short beam length. The springs, in this particular embodiment, are installed in a vertical position, so that the weight of the mirror is supported in tension alone, and the movement of the mirror is restricted by stop pins 55 which prevent the springs from deflecting beyond a safe range.

It is to be understood that the above-described arrangements are illustrative of the application of the principles of the invention. Numerous other arrangements may be devised by those skilled in the art without departing from the spirit and scope of the invention.

What is claimed is:

1. In a motion picture film device in which the film used has sprocket holes, a servo correcting system comprising a light source, means for projecting light from said source onto said film, means for projecting with said light an image of said sprocket holes, and means including a plane, correcting mirror for employing said image to produce an error signal.

2. In a motion picture film device in which the film used has sprocket holes, a servo correcting system comprising a light source, means for projecting light from said source onto said film, means for picking up reflected light images of said sprocket holes, said pick-up means including a rotating mirror drum containing a crown of individually rotatable mirrors mounted perpendicular to the direction of transmission of the light images of said sprocket holes so that said images are reflected by said crown of mirrors, means for comparing these reflected sprocket hole images with a reference position, and means to produce an error signal as the result of said comparison.

3. In a motion picture film device in which the film used has sprocket holes, a servo correcting system comprising a light source, means for projecting light from said source onto said film, means for picking up reflected light images of said sprocket holes, said pickup means including a rotating mirror drum containing a crown of individually rotatable mirrors, and a correcting mirror mounted in the path of transmission of the light images of said sprocket holes so that said images are successively reflected by said crown of mirrors and said correcting mirror, and means for transmitting said reflected sprocket hole images to a photocell error pick-up in which an electrical error signal is generated.

4. In a motion picture film device in which the film used has sprocket holes, a servo correcting system comprising a light source, means for projecting light from said source onto said film, means for picking up reflected light images of said sprocket holes, said pick-up means including a rotating mirror drum containing a crown of individually rotatable mirrors, and a correcting mirror mounted in the path of transmission of the light images of said sprocket holes so that said images are successively reflected by said crown of mirrors and said correcting mirror, said correcting mirror having a variable position, means for transmitting said reflected sprocket hole images to a photocell error pick-up, said photocell error pick-up being so apertured that a deviation from a reference position of said sprocket hole images will cause unbalance in the output produced by said error pick-up, thereby yielding an error signal, and means for applying the error signal to continuously vary the position of said correcting mirror.

5. In a motion picture film device in which the film used has sprocket holes, a servo correcting system comprising a light source, means for projecting light from said source onto said film, means for picking up reflected light images of said sprocket holes, said pick-up means including a rotating mirror drum containing a crown of individually rotatable mirrors, and correcting mirrors mounted in the path of transmission of the light images of said sprocket holes so that said images are successively reflected by said crown of mirrors and said correcting mirrors, said correcting mirrors having a variable position, means for transmitting said reflected sprocket hole images to a photocell pick-up in which an electrical error signal is generated, said photocell pick-up comprising a first and a second photocell, each of said photocells having one aperture which is adapted to admit light therein, and means for applying the error signal to continuously vary the position of said correcting mirrors.

ROBERT E. GRAHAM.
CHARLES F. MATTKE.

References Cited in the file of this patent

UNITED STATES PATENTS

| Number | Name | Date |
| --- | --- | --- |
| 1,348,566 | Jenkins | Aug. 3, 1920 |
| 1,541,218 | Higginson | June 9, 1925 |
| 1,707,498 | Steigman | Apr. 2, 1929 |
| 1,713,663 | Kosken | May 21, 1929 |
| 1,969,465 | Jones | Aug. 7, 1934 |
| 2,073,637 | Hoorn | Mar. 16, 1937 |
| 2,192,987 | Runge | Mar. 12, 1940 |
| 2,278,781 | Harrison | Apr. 7, 1942 |
| 2,506,198 | Charles | May 2, 1950 |
| 2,517,246 | Seitz et al. | Aug. 1, 1950 |
| 2,563,892 | Waller et al. | Aug. 14, 1951 |